Patented July 22, 1947

2,424,325

UNITED STATES PATENT OFFICE 2,424,325

SOLUBLE AMIDINE SALTS

George Newbery, Brentwood, and Alexander Peter Tawse Easson, Hornchurch, England, assignors to May & Baker Limited, Dagenham, Essex, England, a British company No Drawing. Original application April 11, 1942, Serial No. 438,612. Divided and this application May 11, 1945, Serial No. 593,325. In Canada April 7, 1942.

5 Claims. (Cl. 260—501)

This application is a division of application Serial No. 438,612 filed April 11, 1942.

This invention relates to new salts of certain therapeutically-active amidine derivatives and it has for its principal object the provision of a new class of therapeutically active compounds that can be administered in the form of an aqueous solution. A further object is to provide processes for the production of such compounds.

It has already been shown that valuable therapeutic properties are possessed by the symmetrical aromatic diamidines possessing the general formula Am. R. X. R. Am, in which Am represents an amidine group

R represents a benzene radical, and X represents a linkage which may be a single bond or an alkane chain —(CH$_2$)$_n$ (where $n$ represents 1 to 10 and in which also one or more of the CH$_2$ groups may be replaced by oxygen, sulphur or the group NH) or X represents a —CH$_1$=CR$_2$— grouping in which R$_1$ and R$_2$ each represent either a hydrogen atom or a hydrocarbon group (e. g. an alkyl, aryl or aralkyl group). Generally, the salts of these diamidines, such as the hydrochlorides, are not very readily soluble in water. It is an obvious therapeutic advantage to have available stable salts possessing a high degree of solubility in water and the present invention has for its object the production of such salts. In many instances, therapeutically useful basic compounds have been found to furnish extremely soluble salts with methane-sulphonates, but in the case of the various therapeutically useful amidine compounds, such as 4:4'-diamidino-stilbene or 4:4'-diamidino-diphenoxypentane, the dimethane-sulphonates are very little more soluble than the hydrochlorides.

We have discovered a new class of salts of the symmetrical aromatic diamidines having the foregoing general formula, which salts are stable and possess a high degree of solubility in water, such salts being the salts with members of the group consisting of hydroxy-ethane sulphonic acid and hydroxy-propane sulphonic acid.

In general, these new salts can be prepared by combining the diamidine base or a salt thereof with hydroxy ethane sulphonic acid or hydroxy-propane sulphonic acid or with a salt of either of such acids. Specifically, the diamidine base can be directly combined with hydroxy-ethane or hydroxy-propane sulphonic acid or with a suitable salt of either of such acids (e. g. the ammonium salt). Alternatively, the required salts may be formed by producing the diamidine base in situ and in the presence of either one of the said acids or a salt of such acid. Thus, the imino-ether corresponding to the diamidine base may be reacted with the ammonium salt of hydroxy-ethane or hydroxy-propane sulphonic acid. Again, the required salts may be obtained by double decomposition of suitable salt pairs e. g. using the dihydrochloride of the diamidine base and the silver salt of the acid.

Examples of diamidines of the foregoing general formula are: 4:4'-diamidino-diphenoxy pentane, 4:4'-diamidino-diphenoxy propane and 4:4'-diamidino-diphenylether, 4:4'-diamidino-stilbene and 4:4'-diamidino-α,α'-dimethyl-stilbene.

In the following description, there are given, purely by way of illustration, examples of the manufacture of compounds within the scope of the present invention.

*Example I*

4:4' - diamidino-alpha,epsilon-diphenoxy-pentane-di-beta-hydroxy-ethane-sulphonate, prepared by using the theoretical amounts of 4:4'-diamidino-alpha-epsilon-diphenoxy-pentane and beta-hydroxy-ethane-sulphonic acid, warming the mixture to about 40° C. and adding just sufficient water to complete solution, crystallized as prisms on addition of acetone to the aqueous solution. It contains 2½H$_2$O and is soluble in water, approximately 1 in 8 at 20° C.

*Example II*

3.2 grms. of 4:4'-diamidino-alpha,gamma-diphenoxy propane were dissolved in a slight excess of 4N isethionic acid. The solution was just acid to litmus. It was filtered with charcoal, the solids washed with a little methanol and the amidine isethionate precipitated from the filtrate and washings by adding acetone. The yield of the required 4:4'-diamidino-alpha,gamma-diphenoxy propane di-isethionate was 5.2 grms.

We claim:

1. 4:4' - diamidino - alpha,epsilon-diphenoxy-pentane-di-beta-hydroxy-ethane sulphonate.

2. 4:4' - diamidino - alpha,gamma-diphenoxy-propane-di-beta-hydroxy-ethane sulphonate.

3. Process for the production of 4:4'-diamidino - alpha,epsilon - diphenoxypentane-di-beta-hydroxy-ethane-sulphonate, which comprises reacting 4:4' - diamidino-alpha,epsilon-diphenoxy pentane with beta-hydroxy-ethane-sulphonic acid.

4. Process for the production of 4:4'-diamidino-alpha,gamma-diphenoxypropane-di-beta-hydroxy-ethane-sulphonate, which comprises reacting 4:4'-diamidino-alpha,gamma-diphenoxypropane with beta-hydroxy-ethane-sulphonic acid.

5. A member of the group consisting of 4:4'-diamidino-alpha,gamma-diphenoxypropane-di-beta-hydroxy-ethane-sulphonate and 4:4'-diamidino-alpha,epsilon-diphenoxypentane-di-beta-hydroxy-ethane-sulphonate.

GEORGE NEWBERY.
ALEXANDER PETER TAWSE EASSON.